(12) United States Patent
Taniuchi (10) Patent No.: US 12,455,312 B2
(45) Date of Patent: Oct. 28, 2025

(54) INSPECTION DEVICE FOR OPTICAL SEMICONDUCTOR DEVICE CONFIGURED TO CORRECT POSITIONS OF THE PLURALITY OF LEAD TERMINALS

(71) Applicant: Mitsubishi Electric Corporation, Tokyo (JP)

(72) Inventor: Tomohito Taniuchi, Nagasaki (JP)

(73) Assignee: Mitsubishi Electric Corporation, Tokyo (JP)

( * ) Notice: Subject to any disclaimer, the term of this patent is extended or adjusted under 35 U.S.C. 154(b) by 49 days.

(21) Appl. No.: 18/259,990

(22) PCT Filed: Jun. 9, 2021

(86) PCT No.: PCT/JP2021/021926
§ 371 (c)(1),
(2) Date: Jun. 29, 2023

(87) PCT Pub. No.: WO2022/259424
PCT Pub. Date: Dec. 15, 2022

(65) Prior Publication Data
US 2024/0241169 A1    Jul. 18, 2024

(51) Int. Cl.
*G01R 31/26* (2020.01)
*G01R 1/067* (2006.01)

(52) U.S. Cl.
CPC ..... *G01R 31/2601* (2013.01); *G01R 1/06705* (2013.01); *G01R 1/06794* (2013.01)

(58) Field of Classification Search
CPC ............ G01R 1/06705; G01R 1/06794; G01R 31/2601; G01R 31/2635; H01L 23/50; B21D 3/00; B21F 1/02
See application file for complete search history.

(56) References Cited

U.S. PATENT DOCUMENTS 4,611,116 A * 9/1986 Batt .................... G01R 31/2635
324/750.16
6,759,258 B2 * 7/2004 Kasukabe .......... G01R 31/2889
438/18
(Continued)

FOREIGN PATENT DOCUMENTS

CN         106233831 A    12/2016
CN         110112081 A    8/2019
(Continued)

OTHER PUBLICATIONS

International Search Report issued in PCT/JP2021/021926; mailed Aug. 31, 2021.
(Continued)

*Primary Examiner* — Vinh P Nguyen
(74) *Attorney, Agent, or Firm* — Studebaker Brackett PLLC (57) ABSTRACT

A plurality of electrodes (13) are provided on tip ends of a plurality of blocks (8) respectively. The plurality of lead terminals (3) are sandwiched by the plurality of blocks (8) and the plurality of wires (9) to correct positions of the plurality of lead terminals (3). The plurality of electrodes (13) are brought into contact with the plurality of lead terminals (3) to inspect an electrical characteristic of the optical semiconductor device (1).

11 Claims, 8 Drawing Sheets

(56) References Cited

U.S. PATENT DOCUMENTS

| | | | | |
|---|---|---|---|---|
| 7,804,589 B2* | 9/2010 | Tseng | ............... | G01J 1/0223 |
| | | | | 250/221 |
| 9,874,597 B2* | 1/2018 | McCord | ............ | G01R 31/2635 |
| 2015/0316604 A1* | 11/2015 | Mccord | ............. | G01R 31/2601 |
| | | | | 324/762.07 |

FOREIGN PATENT DOCUMENTS

| | | |
|---|---|---|
| CN | 210936882 U | 7/2020 |
| GB | 2 187 123 A | 9/1987 |
| JP | S62-264694 A | 11/1987 |
| JP | 2003-152154 A | 5/2003 |
| JP | 2009-004500 A | 1/2009 |

OTHER PUBLICATIONS

Office Action issued in TW 110148359; mailed by the Taiwan Intellectual Property Office on Nov. 7, 2022.

\* cited by examiner

INSPECTION DEVICE FOR OPTICAL SEMICONDUCTOR DEVICE CONFIGURED TO CORRECT POSITIONS OF THE PLURALITY OF LEAD TERMINALS

FIELD

The present disclosure relates to an inspection device that performs inspection of an optical semiconductor device including a plurality of lead terminals.

BACKGROUND

As functions of an optical semiconductor device become improved, the number of lead terminals that extend from a package becomes increased. For example, as a package for laser diode for optical communication, a package including seven or more lead terminals has been put to practical use as transmission rate of optical communication is increased.

Electrical characteristics of an optical semiconductor device are inspected by inserting lead terminals of the optical semiconductor device into a socket and achieving electrical connection with a device such as a current source or a voltage source, for example. However, if a lead terminal is bent and deformed, for example, the lead terminal cannot be easily inserted into the socket. For the lead terminal being automatically inserted into the socket in an inspection device, deformation of the lead terminal has to be corrected. In this regard, there is proposed an inspection device in which two comb teeth are caused to proceed from sides of lead terminals of an optical semiconductor device, and lead correction is performed by correcting the lead terminals to be arranged at predetermined intervals so as to be inserted into a socket (for example, see PTL 1).

CITATION LIST

Patent Literature

[PTL 1] JP 2003-152154 A

SUMMARY

Technical Problem

However, in a case where the number of lead terminals is great and the lead terminals are arranged in a complex manner, it is difficult to cause comb teeth to intersect each other. Furthermore, because the comb tooth does not include an electrode for inspection, it can perform lead correction but cannot perform electrical inspection. Moreover, in the case where a lead terminal is deformed, the lead terminal may come into contact with the comb tooth, and the lead terminal may be damaged.

The present disclosure has been made to solve such problems, and is aimed at obtaining an inspection device for an optical semiconductor device that can perform lead correction and electrical inspection without damaging lead terminals even when the number of lead terminals is great.

Solution to Problem

An inspection device according to the present disclosure for inspecting an optical semiconductor device having a plurality of lead terminals, includes: a plurality of blocks; a plurality of electrodes provided on tip ends of the plurality of blocks respectively; and a plurality of wires, wherein the plurality of lead terminals are sandwiched by the plurality of blocks and the plurality of wires to correct positions of the plurality of lead terminals, and the plurality of electrodes are brought into contact with the plurality of lead terminals to inspect an electrical characteristic of the optical semiconductor device.

Advantageous Effects of Invention

In the present disclosure, the plurality of lead terminals are sandwiched by the plurality of blocks and the plurality of wires. Positions of the plurality of lead terminals are thereby corrected, and the plurality of electrodes are brought into contact with the plurality of lead terminals to inspect the electrical characteristics of the optical semiconductor device. Lead correction and electrical inspection may be performed simply by increasing or decreasing the wires and the blocks according to an increase or a decrease in the number of the lead terminals. Accordingly, even when the number of lead terminals is great, lead correction and electrical inspection may be performed without damaging the lead terminals.

DESCRIPTION OF EMBODIMENTS

An inspection device for an optical semiconductor device according to the embodiments of the present disclosure will be described with reference to the drawings. The same components will be denoted by the same symbols, and the repeated description thereof may be omitted.

First Embodiment

Figure 1:
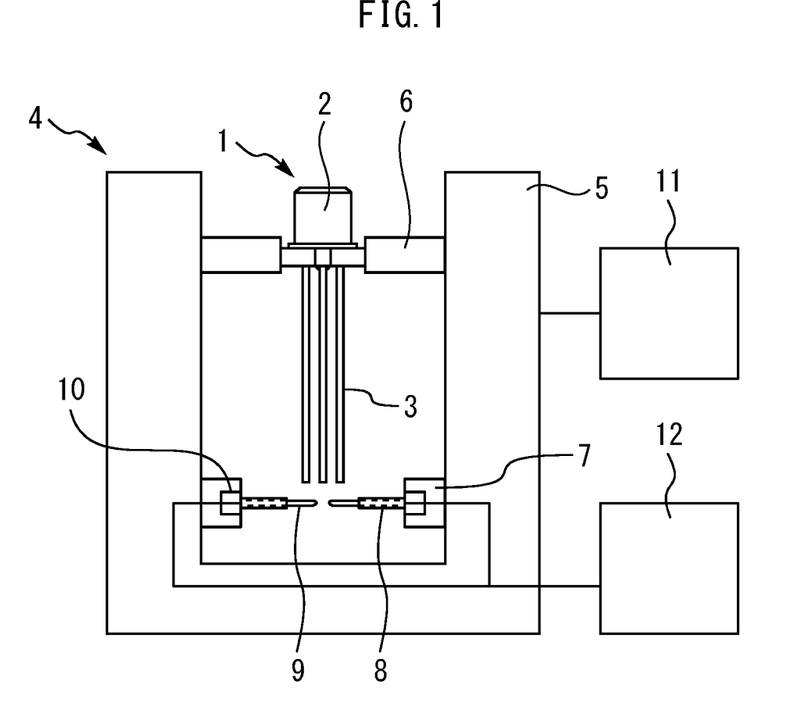
FIG. 1 is a diagram showing an inspection device for an optical semiconductor device according to a first embodiment.

FIG. 1 is a diagram showing an inspection device for an optical semiconductor device according to a first embodiment. An optical semiconductor device 1 includes a package 2, and a plurality of lead terminals 3 protruding from a lower surface of the package 2. Inside the package 2, there are provided a laser diode, a Peltier element for keeping the laser diode at a constant temperature, a thermistor for measuring a temperature, and the like. The lead terminals 3 are a lead terminal that is connected to the laser diode and that allows a high-frequency signal to pass, a lead terminal for the Peltier element, and a lead terminal for the thermistor, for example.

An inspection device 4 is configured in the following manner. A holding unit 6 and a block driving unit 7 are attached to a main body 5. The holding unit 6 holds a strong part, such as a stem, of the package 2 of the optical semiconductor device 1. The block driving unit 7 moves a plurality of blocks 8 relative to the main body 5 in a vertical direction and a horizontal direction. A wire 9 is provided on a tip end of each of the plurality of blocks 8. A wire tightening/loosening device 10 performs an operation of tightening or loosening the wire 9. A control unit 11 controls operation of the block driving unit 7 and the wire tightening/loosening device 10. An electrical characteristics inspection device 12 inspects electrical characteristics of the optical semiconductor device.

Figure 2:
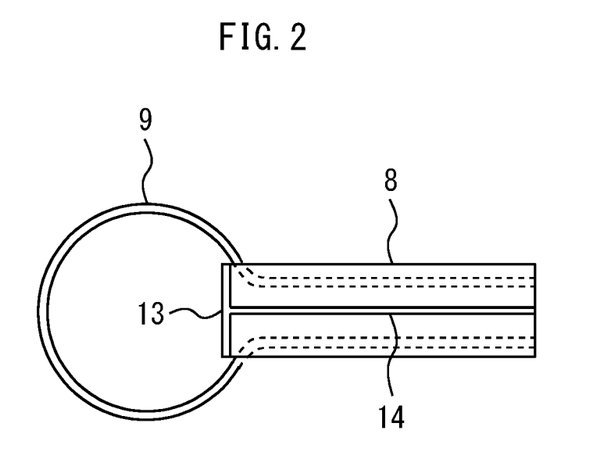
FIG. 2 is a diagram showing the block according to the first embodiment.

FIG. 2 is a diagram showing the block according to the first embodiment. An electrode 13 and a circular wire 9 are provided at a tip end of the block 8. The block 8 is hollow inside, and the wire 9 passes inside the block 8 from the tip end to a proximal end of the block 8. The electrode 13 is conductive metal such as beryllium copper that is nickel- or gold-plated, palladium alloy, or the like. A line 14 for connecting the electrode 13 to the electrical characteristics inspection device 12 is provided on an outside of the block 8.

Figure 3:
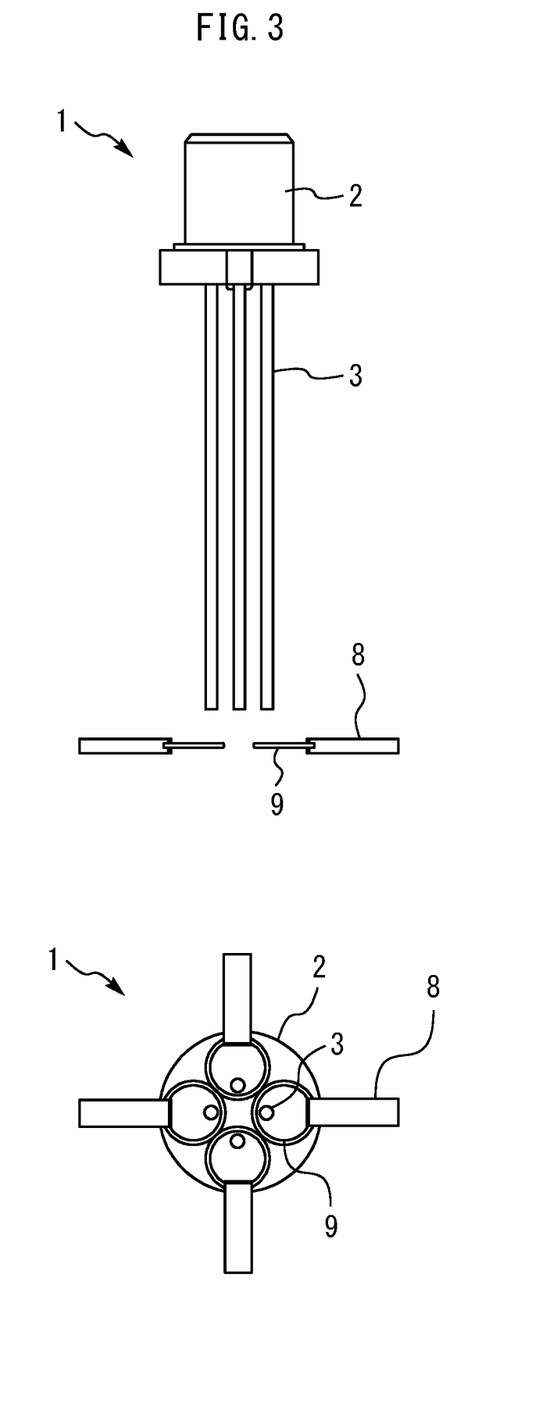
FIG. 3 is a side view and a bottom view showing operation of the inspection device according to the first embodiment.
Figure 4:
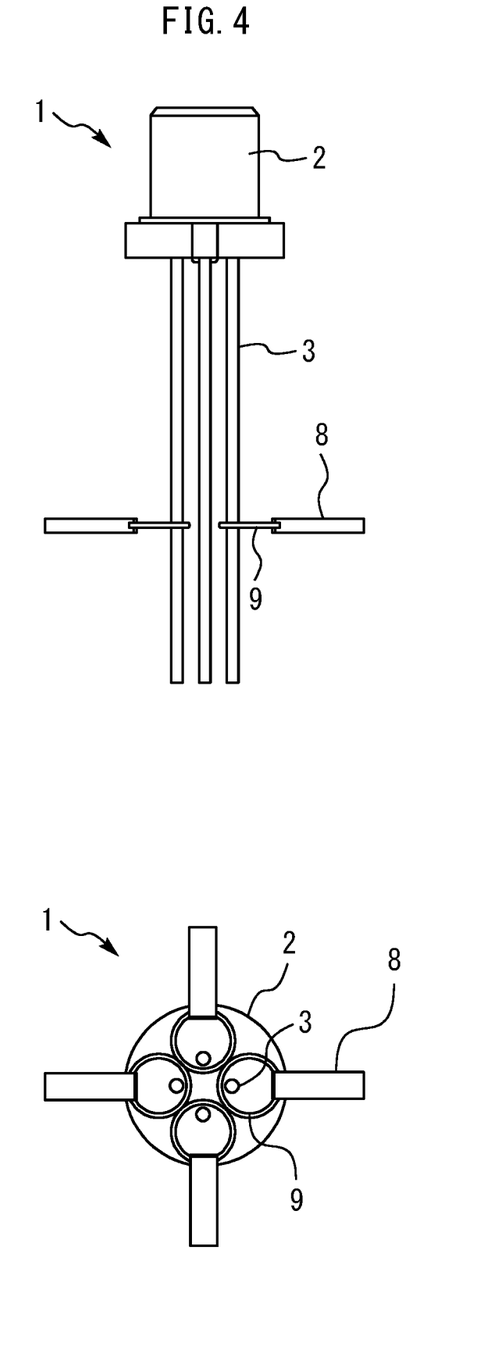
FIG. 4 is a side view and a bottom view showing operation of the inspection device according to the first embodiment.
Figure 5:
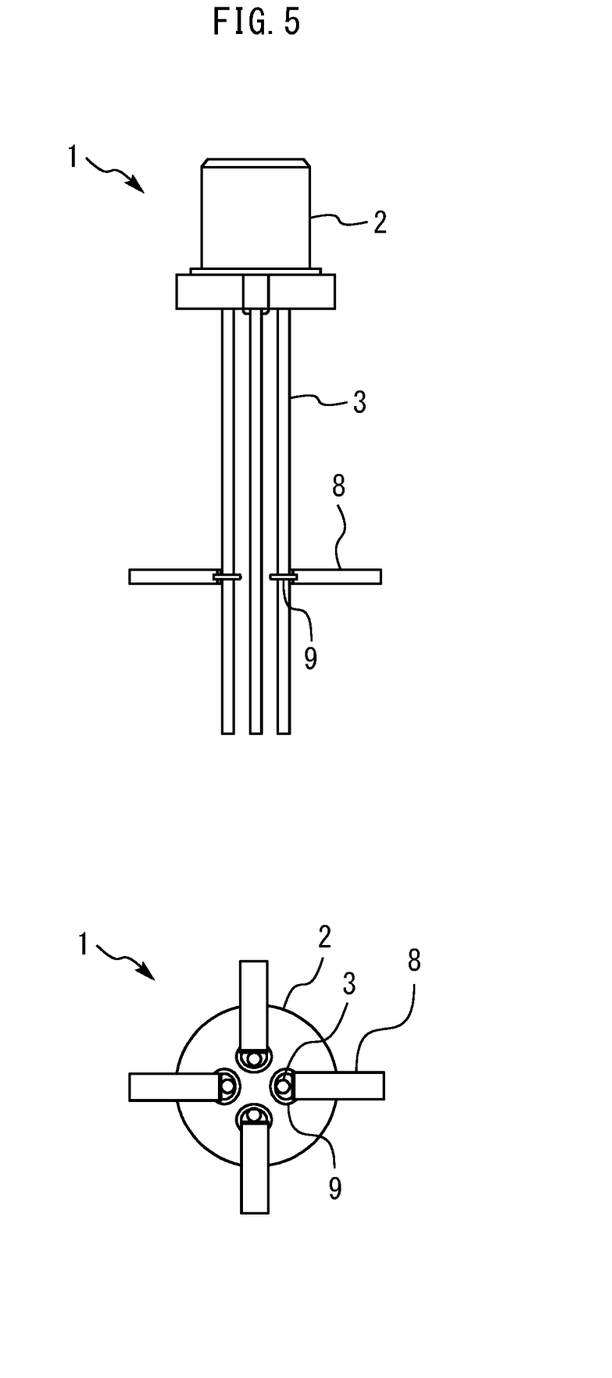
FIG. 5 is a side view and a bottom view showing operation of the inspection device according to the first embodiment.

FIGS. 3 to 5 are side views and bottom views showing operation of the inspection device according to the first embodiment. First, as shown in FIG. 3, the lead terminal 3 of the optical semiconductor device 1 is positioned above a ring of the wire 9. Then, as shown in FIG. 4, the block driving unit 7 moves the block 8 upward, and the lead terminal 3 is caused to pass through the ring of the wire 9. Next, as shown in FIG. 5, the wire tightening/loosening device 10 tightens the wire 9, and at the same time, the block driving unit 7 moves the block 8 inward and presses the tip end of the block 8 against the lead terminal 3. Such operation of the block driving unit 7 and the wire tightening/loosening device 10 is controlled by the control unit 11.

Figure 6:
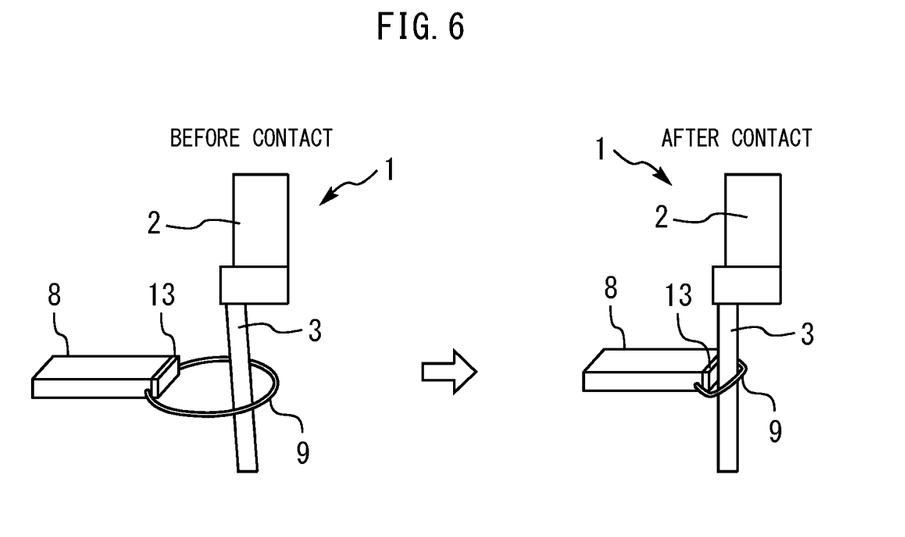
FIG. 6 shows states of the lead terminal before and after the block is brought into contact.

FIG. 6 shows states of the lead terminal before and after the block is brought into contact. The lead terminal 3 is sandwiched by the block 8 and the wire 9. If the lead terminal 3 is thus contained inside the wire 9 that is opened, the position of the lead terminal 3 may be corrected. Furthermore, the electrode 13 is caused to contact the lead terminal 3. When current flows to the electrode 13 from the electrical characteristics inspection device 12, the electrical characteristics of the optical semiconductor device 1 may be inspected.

The wire 9 has to be returned to a circular shape after being tightened, and thus, a material that is capable of remembering the circular shape, such as a shape memory alloy, is desirable. Furthermore, to not influence electrical connection between the electrode 13 and the lead terminal 3, the wire 9 is desirably made as an insulating body by plating, and the block 8 is desirably formed by an insulating body of resin such as PEEK.

As described above, in the present embodiment, a plurality of lead terminals 3 are sandwiched by a plurality of blocks 8 and a plurality of wires 9. Positions of the plurality of lead terminals 3 are thereby corrected, and a plurality of electrodes 13 are brought into contact with the plurality of lead terminals 3 to inspect the electrical characteristics of the optical semiconductor device 1. Lead correction and electrical inspection may be performed simply by increasing or decreasing the wires 9 and the blocks 8 according to an increase or a decrease in the number of the lead terminals 3. For example, as long as the lead terminals 3 are on a same circular perimeter, application to seven or more pins is also possible. Moreover, even in a case where the number of lead terminals 3 is great and arrangement is complex, narrow wires 9 may come between the lead terminals 3. Accordingly, even when the number of lead terminals 3 is great, lead correction and electrical inspection may be performed without damaging the lead terminals 3.

Second Embodiment

Figure 7:
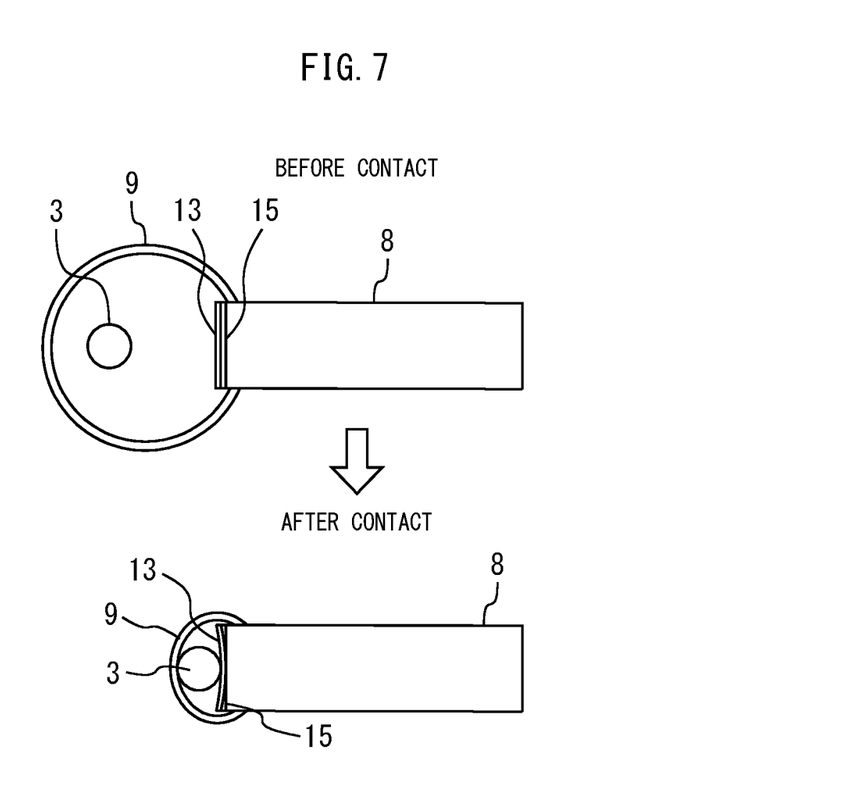
FIG. 7 is a diagram showing the inspection device for the optical semiconductor device according to a second embodiment.

FIG. 7 is a diagram showing the inspection device for the optical semiconductor device according to a second embodiment. An elastic body 15 is provided between the tip end of each block 8 and the electrode 13. The elastic body 15 is rubber, but may alternatively be sponge or a flat spring, for example. When the electrode 13 and the lead terminal 3 come into contact with each other, the electrode 13 and the elastic body 15 deform along the lead terminal 3. Accordingly, contact between the lead terminal 3 and the electrode 13 is improved than in the first embodiment. Additionally, if the elastic body 15 has an insulating property, electricity does not flow to the block 8, and thus, the material of the block 8 may be conductive. Because the electrode 13 has to be deformed along the lead terminal 3, the electrode 13 is desirably thin metal such as a gold ribbon.

Third Embodiment

Figure 8:
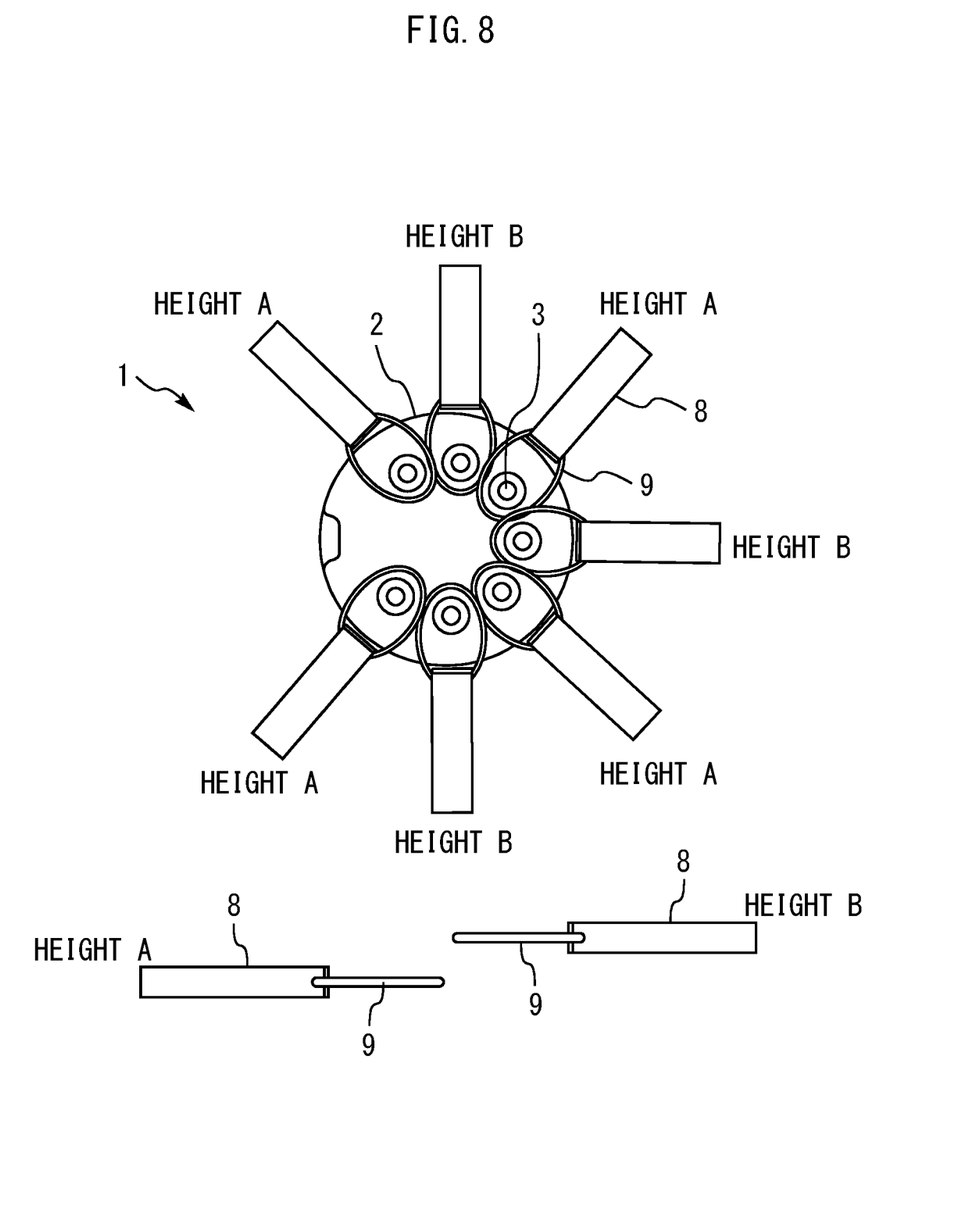
FIG. 8 is a diagram showing the inspection device for the optical semiconductor device according to a third embodiment.

FIG. 8 is a diagram showing the inspection device for the optical semiconductor device according to a third embodiment. In the present embodiment, the wire 9 has an oval shape. Because a width of the ring of the wire 9 is reduced, jigs that are each formed from the wire 9 and the block 8 may be positioned adjacently. Moreover, the wires 9 provided at tip ends of adjacent blocks 8 are at different heights. By staggering the heights, adjacent wires 9 may be prevented from interfering with each other. Accordingly, the present embodiment may be applied to an optical semiconductor device with a great number of lead terminals 3. Other structures and advantageous effects are the same as those in the first embodiment.

Fourth Embodiment

Figure 9:
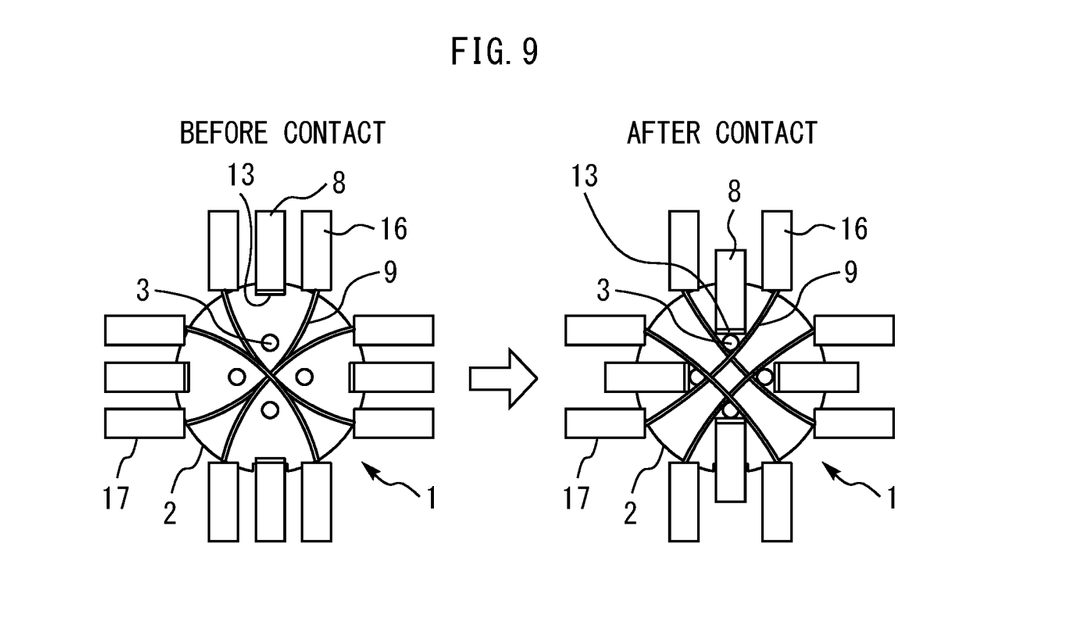
FIG. 9 is a diagram showing the inspection device for the optical semiconductor device according to a fourth embodiment.

FIG. 9 is a diagram showing the inspection device for the optical semiconductor device according to a fourth embodiment. A plurality of wire holding units 16, 17 hold a plurality of wires 9. The plurality of wires 9 are line-shaped, and are positioned in a grid pattern. Other structures are the same as those in the first embodiment.

The plurality of blocks 8 move inward relative to the plurality of lead terminals 3, and at the same time, the plurality of wire holding units 16, 17 move the plurality of wires 9 outward relative to the plurality of lead terminals 3, and the plurality of lead terminals 3 are thereby sandwiched by the plurality of blocks 8 and the plurality of wires 9. Positions of the plurality of lead terminals 3 are thereby corrected, and the plurality of electrodes 13 are brought into contact with the plurality of lead terminals 3, and the electrical characteristics of the optical semiconductor device 1 are inspected.

The lead terminal 3 has to be inserted in a region between the wires 9 and the block 8. When comparing the diagrams showing states before contact, an area of the region where the lead terminal 3 is to be inserted is about 3 mm$^2$ in the first embodiment and about 3.6 mm$^2$ in the fourth embodiment. Accordingly, a range in which the lead terminal 3 may be corrected may be increased than in the first embodiment.

Fifth Embodiment

Figure 10:
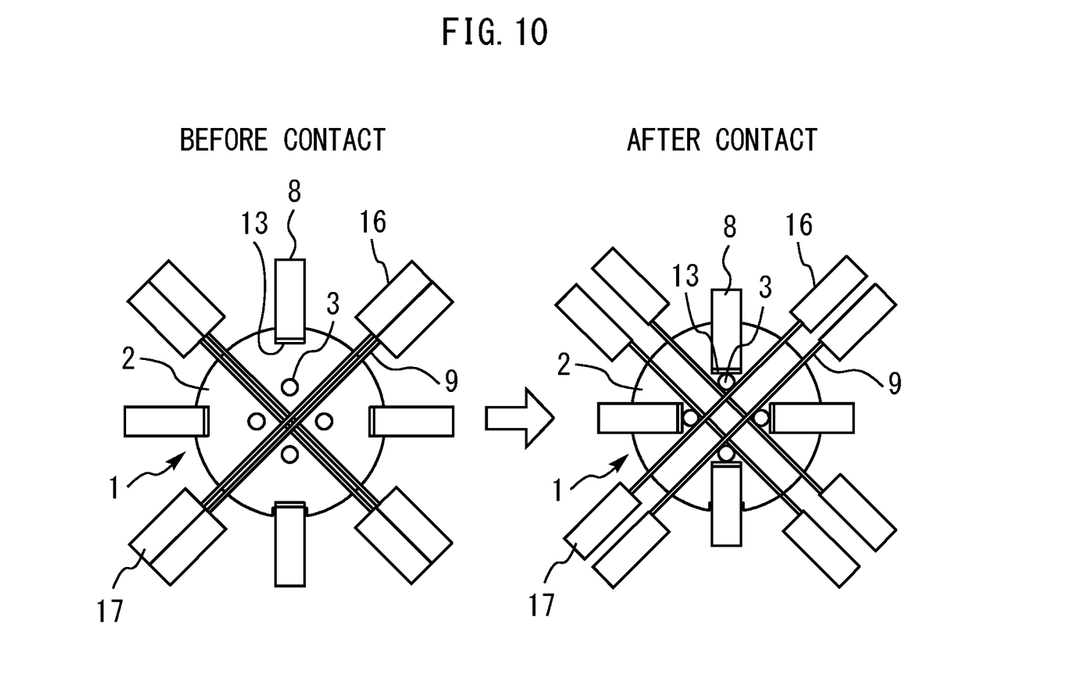
FIG. 10 is a diagram showing the inspection device for the optical semiconductor device according to a fifth embodiment.

FIG. 10 is a diagram showing the inspection device for the optical semiconductor device according to a fifth embodiment. The plurality of wires 9 are straight, and are positioned in a grid pattern. The wire holding units 16, 17 press the corresponding wire 9 against the corresponding lead terminals 3 while keeping the wire 9 straight. Other structures are the same as those in the fourth embodiment.

When comparing the diagrams showing states before contact, the area of the region where the lead terminal 3 is to be inserted is about 3.6 mm$^2$ in the fourth embodiment and about 4.8 mm$^2$ in the fifth embodiment. Accordingly, a range in which the lead terminal 3 may be corrected may be increased than in the fourth embodiment.

Sixth Embodiment

Figure 11:
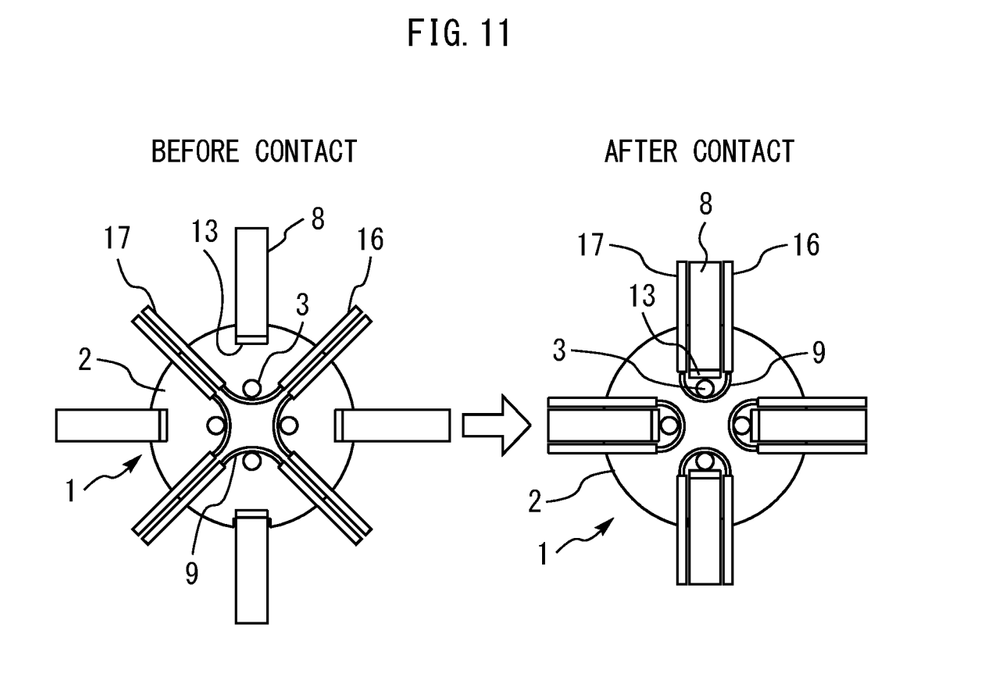
FIG. 11 is a diagram showing the inspection device for the optical semiconductor device according to a sixth embodiment.

FIG. 11 is a diagram showing the inspection device for the optical semiconductor device according to a sixth embodiment. The wire holding units 16, 17 holding the wire 9 are positioned at a right angle. The plurality of wires 9 are arc-shaped and are positioned on inner sides than the plurality of lead terminals 3. Other structures are the same as those in the first embodiment.

The plurality of blocks 8 move inward relative to the plurality of lead terminals 3, and at the same time, the plurality of wire holding units 16, 17 are closed toward the blocks 8 while moving in opposite directions from the blocks 8, and thus, the plurality of lead terminals 3 are sandwiched by the plurality of blocks 8 and the plurality of wires 9. Positions of the plurality of lead terminals 3 are thereby corrected, and the plurality of electrodes 13 are brought into contact with the plurality of lead terminals 3, and the electrical characteristics of the optical semiconductor device 1 are inspected.

When comparing the diagrams showing states before contact, the area of the region where the lead terminal 3 is to be inserted is about 3.6 mm$^2$ in the fourth embodiment and about 4.3 mm$^2$ in the sixth embodiment. Accordingly, a range in which the lead terminal 3 may be corrected may be increased than in the fourth embodiment.

REFERENCE SIGNS LIST

1 optical semiconductor device; 3 lead terminal; 8 block; 9 wire; 13 electrode; 15 elastic body; 16,17 wire holding unit

The invention claimed is:

1. An inspection device for inspecting an optical semiconductor device having a plurality of lead terminals, comprising:
    a plurality of blocks;
    a plurality of electrodes provided on tip ends of the plurality of blocks respectively; and
    a plurality of wires,
    wherein the plurality of blocks and the plurality of wires are configured to sandwich the plurality of lead terminals such that each of the plurality of lead terminals is sandwiched between one of the blocks and at least one of the wires to correct positions of the plurality of lead terminals, and
    the plurality of electrodes are configured to be brought into contact with the plurality of lead terminals to inspect an electrical characteristic of the optical semiconductor device.

2. The inspection device for an optical semiconductor device according to claim 1, wherein each wire has a circular shape, is provided at a tip end of the corresponding block, and is configured to perform an operation of tightening or loosening around a corresponding lead terminal among the plurality of lead terminals.

3. The inspection device for an optical semiconductor device according to claim 2, further comprising an elastic body provided between the tip end of each block and the electrode.

4. The inspection device for an optical semiconductor device according to claim 2, wherein each wire has an oval shape.

5. The inspection device for an optical semiconductor device according to claim 2, wherein the wires provided at the tip ends of adjacent blocks are at different heights.

6. The inspection device for an optical semiconductor device according to claim 1, further comprising a plurality of wire holding units holding the plurality of wires respectively,
    wherein the plurality of blocks are configured to move inward relative to the plurality of lead terminals, and at the same time, the plurality of wire holding units are configured to move the plurality of wires outward relative to the plurality of lead terminals so that the plurality of lead terminals are sandwiched by the plurality of blocks and the plurality of wires respectively.

7. The inspection device for an optical semiconductor device according to claim 6, wherein the plurality of wires are line-shaped.

8. The inspection device for an optical semiconductor device according to claim 6, wherein the plurality of wires are straight, and
    each wire holding unit is configured to press the corresponding wire against the corresponding lead terminal while keeping the corresponding wire straight.

9. The inspection device for an optical semiconductor device according to claim 6, wherein the plurality of wires are arc-shaped.

10. The inspection device for an optical semiconductor device according to claim 1, wherein the wires are flexible.

11. The inspection device for an optical semiconductor device according to claim 1, wherein the plurality of wires are configured to be tightened around the plurality of lead terminals and loosened around the plurality of lead terminals.

* * * * *